United States Patent [19]

Harms

[11] Patent Number: 4,538,917
[45] Date of Patent: Sep. 3, 1985

[54] SCREW EXTRUDER

[75] Inventor: Engelbert G. Harms, Aachen, Fed. Rep. of Germany

[73] Assignee: Uniroyal Englebert Reifen GmbH, Aachen, Fed. Rep. of Germany

[21] Appl. No.: 690,376

[22] Filed: Jan. 9, 1985

Related U.S. Application Data

[63] Continuation of Ser. No. 450,636, Dec. 17, 1982, abandoned.

[30] Foreign Application Priority Data

Dec. 22, 1981 [DE] Fed. Rep. of Germany ....... 3150719

[51] Int. Cl.³ .............................................. B01F 7/08
[52] U.S. Cl. ...................................... 366/75; 366/80; 366/90; 366/324
[58] Field of Search ........................ 159/2 E; 264/102; 366/76, 79, 80, 87, 89, 90, 99, 302, 303, 307, 318, 324; 425/203, 208

[56] References Cited

U.S. PATENT DOCUMENTS 3,193,877 7/1965 Edwards ............................ 159/2 E
3,367,635 2/1968 Gresch ................................ 366/80
3,870,285 3/1975 Bausch ................................ 366/80
4,107,260 8/1978 Dougherty ......................... 366/79
4,199,263 4/1980 Menges et al. ..................... 366/90

Primary Examiner—Robert W. Jenkins
Assistant Examiner—Arthur D. Dahlberg
Attorney, Agent, or Firm—Becker & Becker

[57] ABSTRACT

A screw extruder for mixing, homogenizing, and degassing highly viscous rubber mixtures and similarly acting thermoplastics. The extruder has mixing pins associated with the housing in the mixing and homogenizing zone, and degassing pins associated with the housing in the degassing zone. The degassing pins have passages or channels through which gases and vapors are withdrawn. The retaining or damming structure at the entrance to the degassing zone can also be formed of pins associated with the housing. The conveyed material is mechanically and thermally satisfactorily made uniform by the inventive pin arrangement without material shearing forces, and can also be effectively and favorably degassed. High flow-through rates of the material can be achieved with high product quality.

2 Claims, 9 Drawing Figures

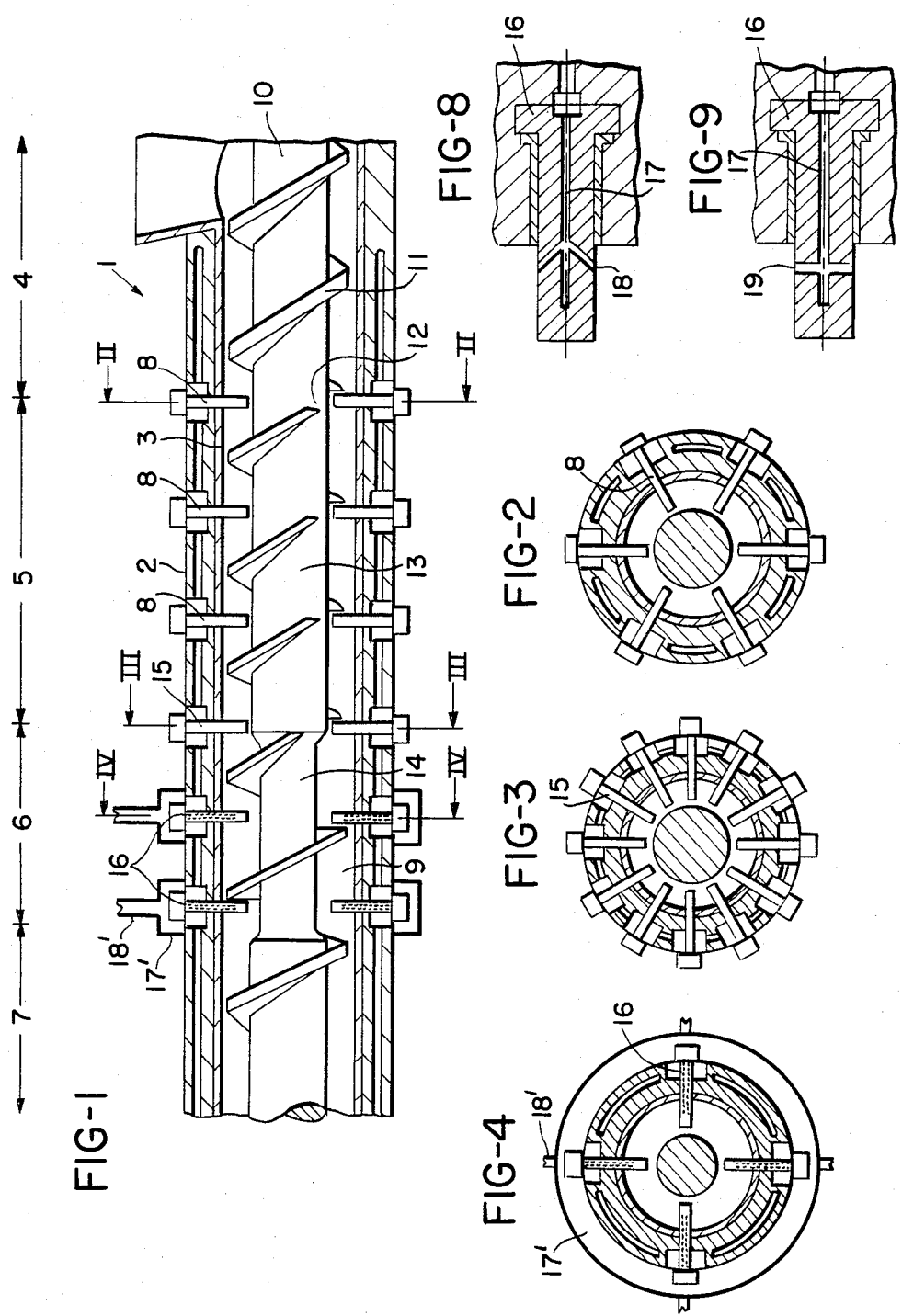

SCREW EXTRUDER

This application is a continuation of application Ser. No. 450,636, filed Dec. 17, 1982, now abandoned.

BACKGROUND OF THE INVENTION

The present invention relates to a screw extruder for mixing, homogenizing, and degassing highly viscous rubber mixtures and similarly acting thermoplastics; the extruder includes a housing having a cylindrical bore and a rotatable, permanently mounted screw conveyor which has an entry segment, a mixing and homogenizing segment, and a degassing segment; the screw chamber of the screw conveyor is connected with the atmosphere or a vacuum source via a line, channel, or the like in the housing; also provided are pins, studs or other obstacle means which are distributed over the periphery of the housing and are adapted to extend from the housing radially inwardly into the space, i.e. screw chamber, between the screw conveyor and the housing.

When rubber mixtures are extruded into profiled articles, hoses, cords, etc., as well as during cable covering or sheathing with subsequent, generally pressureless, vulcanization, air or/and moisture present in the mixture can lead to an undesired porosity of the vulcanized goods.

Rubber mixtures or thermoplastic compositions are degassed in order to eliminate these deficiencies in quality. This degassing occurs in so-called degassification regions or vacuum zones of the respectively employed extruder. The mixture is dosed subsequent to a retaining or damming means into an enlarged volume zone in which the mixture can expand and new surfaces formed can be degassed.

According to U.S. Pat. No. 1,283,947 Steinle issued Nov. 5, 1948, it is known to provide the screw conveyor with a retaining or obstruction ring, or split ring, in the degassing region. An evacuation channel or passage is arranged in the housing directly after the ring. Furthermore, pins are secured to the housing in this region. The rubber mixture is first cut or sheared by the narrow ring gap, thereby receiving a film-like form which is separated into individual parts by the pins. The gases and moist particles are suctioned off in this phase. The evacuation channel or passage is provided for the entire degassing zone. A high vacuum must under certain circumstances be applied in order to be able to effectively degassify. Even then, not all trapped gas particles or moisture particles can be removed through this single channel.

According to German Offenlegungsschrift No. 21 60 062, it is known to provide the screw conveyor with a retaining or obstruction ring in the degassing region, and to provide the housing with an axially displaceable sleeve in order to provide regulation of the rate of flow of the conveyed mass of synthetic material prior to degassing. Additional aids for dividing the material can be provided in the form of longitudinal ribs on the screw conveyor, and/or pins secured to the housing. Degassing is effected with the aid of a single degassing channel or passage arranged in the housing. Such a degassing channel is generally tunnel-shaped in the screw conveyor housing wall.

A further extruder, disclosed by Swiss Pat. No. 510 512, has such a channel or tunnel for degassing. This extruder is further provided with auxiliary means, for releasing the gases, in the form of oscillation-generating ultrasonic devices. Roller bodies or pistons can also be employed.

All known screw extruders have available a degassing channel through which the rubber mixture or synthetic material mass is degassed by virtue of the applied vacuum. An effective degassing requires a homogeneous preparation in the mixing and homogenizing zone, and a mass conveyed into the degassing region as constant as possible with regard to the volume, temperature and viscosity. Additionally, the degassing or evacuation of the material, which exists in an expanded state in the degassing region, is to occur if possible at many locations simultaneously. This, however, is not possible with the known degassing screw extruders.

It is an object of the present invention effectively and advantageously to degassify a mechanically and thermally satisfactorily uniform mass during the processing of highly viscous rubber mixtures and similarly acting thermoplastics with a screw extruder of the aforementioned general type while avoiding significant shear flow due to splitting up the conveyed mass or material into numerous rearranged, surface-enlarged partial material flows, and to thereby avoid the disadvantages of the heretofore known degassifying extruders.

SUMMARY OF THE INVENTION

The extruder of the present invention is characterized primarily in that the mixing and homogenizing segment is provided with interrupted screw conveyor lands or threads, and housing pins which penetrate this segment; in that the degassing segment also has interrupted screw conveyor lands with pin arrangements associated therewith, with the pins extending radially from the housing between the interrupted screw lands; and in that the screw conveyor chamber, in which the expanded conveyed material is located, can be degassified by the pins. The pins have degassifying channels or passages for this purpose.

The pins are preferably distributed over the periphery in a manner comparable to a pin ring or wreath. Two such pin ring arrangements are advantageously provided for degassifying, and have certain axial spacing from one another. The pins are provided with channels or passages, the opening of which is located in the vicinity of the housing wall. In this manner, gases and moisture particles can be withdrawn from the material without difficulty at numerous locations of the degassing region. Furthermore, it is also possible at any given time to apply a higher or lower required vacuum at different suction locations via separate vacuum lines, so that degassing is not only effective, but is also economical.

Each pin ring arrangement, where more than one pin ring is provided, may be offset by an angle of rotation relative to the other pin ring arrangements.

Pins with bores are known and have been proposed for injecting vapor or liquids. Their object and application, however, is not comparable with the pin arrangement according to the present invention. In conformity with the pursued purpose, such heretofore known pins are fundamentally different from those of the present invention.

Pursuant to the object of the present invention, the pins are auxiliary means for the best possible degassification. Just like the mixing pins, these pins are structurally advantageously arranged along the periphery of the screw housing, are simple to operate and service, in case this should be necessary, and can be conveniently and reliably connected to a vacuum device.

According to a further feature of the present invention, a special pin arrangement is designed to form the required material retaining or damming means at the entrance to the degassing region. The degassing segment includes a material retaining or damming means, and a reduced pressure zone. Generally, the retaining or damming means is a retaining or obstruction ring which increases the pressure of the material. The mixture expands in the following reduced pressure zone. In this phase the material is favorably degassified.

According to the present invention, the retaining or obstruction ring is replaced by pins which are provided in at least one plane disposed transverse or at right angles to the axis of the screw conveyor. The pins are relatively numerous, are arranged closely adjacent to one another, and are distributed over the periphery. The pins form a compact pin ring which preferably includes at least twelve pins. As a result of this arrangement, the pin ring is a suitable retaining or damming means. In contrast to the mixing pin arrangements, which generally comprise six to eight pins, the pins of the retaining means are considerably closer together. The material flow is divided by this special pin arrangement into a plurality of partial flows extending as far as to the screw conveyor channel base, thus assuring that trapped air or gas bubbles are exposed better than was possible with the known methods over a considerably enlarged cross section, and are released for the degassing.

The screw extruder with mixing pins is similar to that disclosed in U.S. Pat. Nos. 4,178,104 Menges et al, dated Dec. 11, 1979 and 4,199,263 Menges et al dated Apr. 22, 1980, the contents of which are hereby incorporated in their entirety by reference thereto. The screw extruder according to the present invention improves on this prior art by providing novel degassing means and novel retaining or damming means.

BRIEF DESCRIPTION OF THE DRAWINGS

This object, and other objects and advantages of the present invention, will appear more clearly from the following specification in connection with the accompanying drawings, in which:

FIG. 1 is a schematic illustration of one embodiment of a screw extruder according to the present invention in a partial longitudinal section;

FIG. 2 is a cross section taken along line II—II in FIG. 1;

FIG. 3 is a cross section taken along line III—III in FIG. 1;

FIG. 4 is a cross section taken along line IV—IV in FIG. 1;

FIG. 8 shows details of a pin in section; and

FIG. 9 shows further details of a pin in section.

DESCRIPTION OF PREFERRED EMBODIMENTS

Figure 5:
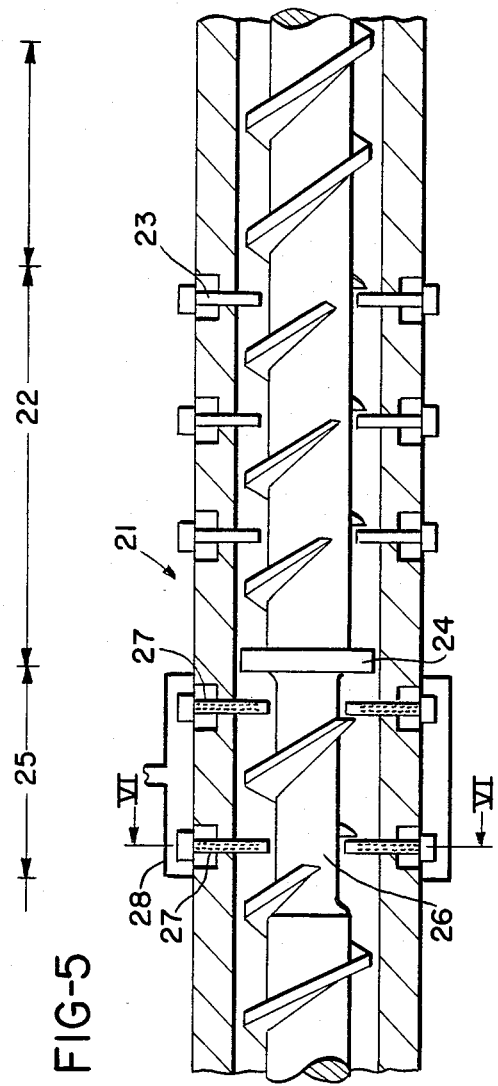
FIG. 5 schematically illustrates a further screw extruder according to the present invention in a partial longitudinal section.

Referring now the drawings in detail, the screw extruder 1 illustrated in FIG. 1 essentially comprises a housing 2, which is constructed for tempering fluid circulation, and has a cylindrical bore 3 and an axially fixed screw conveyor 10 rotatably movable therein.

The charging or entry zone of the extruder is represented by the reference numeral 4; a mixing and homogenizing zone of the extruder is represented with the reference numeral 5; a degassing zone of the extruder is represented by the reference numeral 6; and the discharge zone of the entruder is designated with the reference numeral 7.

In the entry zone 4, the screw conveyor 10 is provided with uninterrupted screw lands 11. In the mixing and homogenizing zone 5, the lands of the screw conveyor are interrupted. The interruptions are designated with the reference numeral 12. The housing 2 has radially arranged pins 8 at the locations of these interruptions 12. The pins 8 are distributed about the periphery, and form a pin ring or wreath, as recognizable in FIG. 2. The pins 8 project from the housing 2 into the screw conveyor chamber 9, which is delimited by the housing bore wall 3, the screw conveyor core surface 13, and the screw conveyor lands 11.

The pins 8 fulfill the objective of thoroughly mixing the conveyed material, whether it be a rubber mixture or a thermoplastic, and to homogenize the material not only mechanically but also thermally. This effect is independent of the depth of the screw conveyor lands and, to the extent it is independent of the screw diameter, is attained with good discharge efficiency.

With the arrangement of the pins, the principle of flow division and shifting of material flow transverse to the flow direction is used with the objective of turning layer or batch interfaces which are transverse to the direction of flow in the direction of flow, as well as to significantly expand and as a result enlarge the interfaces, and to join the separated layers with the other layers.

This procedure of continuously creating new surfaces and enlarging them, accompanied by extensively avoiding shearing flows, effects an outstanding mixing and homogenizing effect with thermally conservative treatment.

This treatment is necessary in order to optimally remove the gases and moisture particles present in the material in the so-called degassing zone.

Moisture, trapped air particles, and other gas particles, which formed, for instance, from low boiling plasticizers, are withdrawn by evaporation from the highly viscous rubber mixtures during the degassing at processing temperatures of approximately 100° C.

This is also of great importance when producing profiled articles of foam rubber, because only the propellant which gassifies at higher temperatures leads to the desired cell formation so that a fine and uniformly porous extruded article with good dimensional tolerances can result.

The screw extruder first has a special arrangement of pins 15 directly before the degassing region 6. The pins 15 are distributed over the periphery, and are arranged in a relatively compact pin ring or wreath. FIG. 3 illustrates this arrangement very clearly. The significance of this arrangement is to have available a material retaining or damming means which increases the pressure in the material. The actual degassing zone 6 has a larger volume screw conveyor chamber in which the prevailing pressure is relatively low. This is obtained in the present situation by a reduction of the screw core, as indicated at 14. The material is expanded in this zone, increases in volume, and is easily degassed.

Further pins 16 are provided for this purpose. These pins 16 are also distributed about the periphery, and are arranged in one, two, or if necessary, more pin rings or wreaths. The pins 16 project into the screw conveyor chamber 9 which is to be degassed. Due to the number of pins 16, for instance four pins per ring (FIG. 4), the pins 16 are directly available at numerous locations of the screw conveyor chamber 9 for withdrawing gases and vapors. The pins 16 of the first ring, as viewed in the conveying direction, are offset by 45° with respect to the pin 16 of the second ring. The pins 16 have bores 17 and transverse channels or passages 18, 19, as recognizable in FIGS. 8 and 9. The broken line indicates the housing bore surface. The openings of the suction channels are arranged in the vicinity of this housing bore. As shown in FIGS. 1 and 4, the pins 16 are surrounded by a suitable, outwardly sealed-off housing 17' which is connected by lines 18' or other auxiliary means with a non-illustrated vacuum pump.

The degassing by applying vacuum occurs in a zone of the screw conveyor in which, due to greater screw land depth, increased distance between screw lands, or screw housing bore expansion, there is provided a greater volume screw chamber.

The degassing occurs in the screw extruder 1 via degassing pins 16 which are provided in a plane transverse to the axis of the screw and are distributed over the periphery. In the illustrated embodiment, two pin rings of pins 16 equally axially spaced apart are provided. Each pin ring generally has four to six pins. This number of pins is, however, not mandatory.

Figure 6:
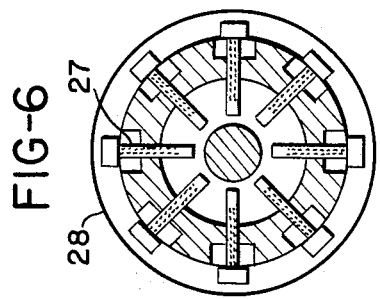
FIG. 6 is a cross section taken along line VI—VI in FIG. 5.

The screw extruder 21 illustrated in FIG. 5 is constructed basically similar to the extruder according to FIG. 1. The screw extruder 21 also has a mixing and homogenizing zone 22 with mixing pins 23. The material retaining or damming means, however, is in this instance constructed as a retaining or damming ring 24 in conformity with the state of the art. The degassing zone 25 includes a reduced screw portion in the screw core 26, and the degassing pins 27. The degassing pins 27 are distributed over the periphery, and each peripheral row includes for instance eight pins 27. The pins 27 of the first row, as viewed in the conveying direction, can be offset by an angle in the circumferential direction relative to those pins of the second row. FIG. 6 shows the peripheral arrangement of a pin ring. All of the degassing pins 27 are enclosed by a housing 28 arranged externally on the screw housing; the lines, channels, or similar means are connected to the housing 28 and also with the non-illustrated vacuum pump.

Figure 7:
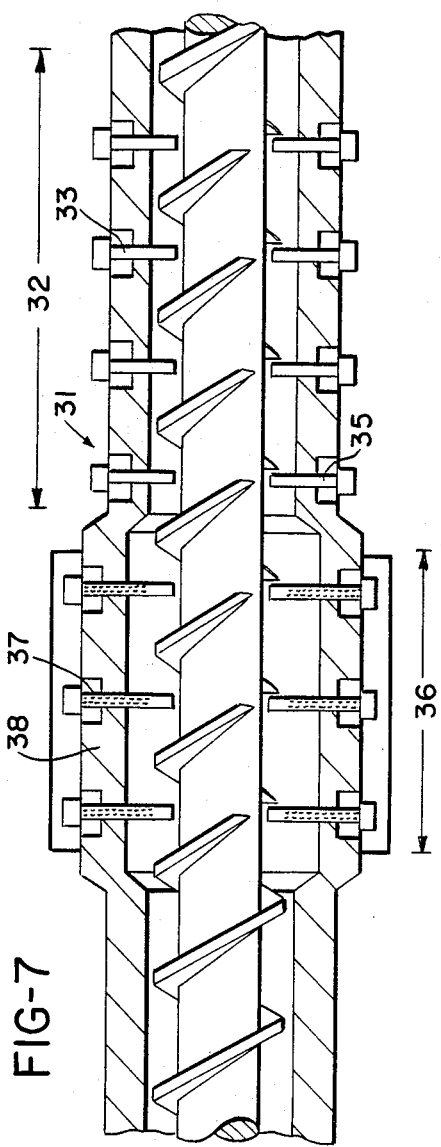
FIG. 7 schematically illustrates a further inventive screw extruder in partial longitudinal section.

The screw extruder 31 illustrated in FIG. 7 is constructed basically similar to the extruder according to FIG. 1. The screw extruder 31 has mixing pins 33 in the mixing and homogenizing zone 32, retaining or damming pins 35, and degassing pins 37 in the degassing zone 36. This degassing zone 36 is distinguished by a radially widened portion 38 of the screw housing.

The pin arrangement of the pins 35 corresponds substantially to that according to FIG. 3, and the pin arrangement of the pins 37 corresponds substantially to that of FIG. 4. The individual pin rings are preferably offset relative to one another in the peripheral direction, for instance by an angle of 45°.

The present invention is, of course, in no way restricted to the specific disclosure of the specifications and drawings, but also encompasses any modifications within the scope of the appended claims.

What I claim is:

1. A screw extruder for mixing, homogenizing, and degassing highly viscous rubber mixtures and similarly acting thermoplastics, said extruder including: a housing having a cylindrical bore and passage means leading to an environment which is at a pressure of no greater than atmospheric pressure;

a screw conveyor which is rotatably fixed in said housing; said screw conveyor including a channel base as well as an entry zone for receiving material in a flow path of material, a mixing and homogenizing zone to homogenize the material mechanically as well as thermally for a temperature level reduction attained with good discharge efficiency, and a degassing zone; a screw conveyor chamber that is formed between said screw conveyor and the bore wall of said cylindrical bore of said housing, said screw conveyor chamber being in communication with said passage means of said housing; the improvement in combination therewith comprising:

pin-like members distributed over the periphery of the bore wall of said cylindrical bore of said housing in such a manner that said pin-like members are not totally blocking the flow while avoiding any significant shear flow due to splitting up the conveyed mass or material thereby to avoid disadvantages thereof and permitting temperature level reduction therewith, said pin-like members being adapted to extend radially inwardly from said housing into said screw conveyor chamber and being adapted at least in part for performance of multi-functions including mixing, homogenizing, viscosity reducing and equalization; and means for stagnation or obstruction before any degasification is said degassing zones and also for degassification in reduced pressure of degassing zone; and interrupted lands, i.e., lands with gaps between successive portions thereof, on said screw conveyor in said mixing and homogenizing and said degassing zones thereof; with said pin-like members including first pin-like members which extend into said screw conveyor chamber and between said interrupted lands of said mixing and homogenizing zone, and second pin-like members which extend into said screw conveyor chamber and between said interrupted lands of said degassing zone; said second pin-like members themselves being provided with degassing channels therein respectively for effecting degassification in said degassing zones via said communication of said screw conveyor chamber with said passage means of said housing, said second pin-like members thus serving the multi-functions particularly in said screw extruder via multiple degassing channels;

at least some of said second pin-like members being disposed peripherally in at least one pin ring which is a suitable retaining or damming means, each of which is adapted to communicate with a vacuum source;

there being at least two pin rings, with said second pin-like members of a given pin ring being displaced as offset by a predetermined angle of rotation from said second pin-like members of the other of said pin rings to that material flow is divided by pin arrangement into a plurality of partial flows extending as far as to the screw conveyor channel base, thus assuring that trapped air or gas bubbles are exposed better over a considerably enlarged cross section and are released for the degassing;

said degassing zone of said screw conveyor further including a material retaining means and a reduced pressure zone; said pin-like members further including third pin-like members which form said material retaining means, said third pin-like members being disposed in at least one plane which extends transverse to the axis of said screw conveyor, each plane including numerous, closely adjacent third pin-like members.

2. An extruder in combination according to claim 1, in which said pin rings are connectible to devices producing different underpressure.

* * * * *